(12) United States Patent
Ogawa

(10) Patent No.: US 12,291,203 B2
(45) Date of Patent: May 6, 2025

(54) VEHICLE DRIVING SUPPORT DEVICE

(71) Applicant: TOYOTA JIDOSHA KABUSHIKI KAISHA, Toyota (JP)

(72) Inventor: Toshiro Ogawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 280 days.

(21) Appl. No.: 17/965,317

(22) Filed: Oct. 13, 2022

(65) Prior Publication Data

US 2023/0125119 A1 Apr. 27, 2023

(30) Foreign Application Priority Data

Oct. 27, 2021 (JP) ................................. 2021-175407

(51) Int. Cl.
*B60W 30/12* (2020.01)
*B60W 30/18* (2012.01)
*B60W 60/00* (2020.01)

(52) U.S. Cl.
CPC ...... *B60W 30/12* (2013.01); *B60W 30/18163* (2013.01); *B60W 60/0025* (2020.02); *B60W 2552/53* (2020.02)

(58) Field of Classification Search
CPC ........... B60W 30/12; B60W 30/18163; B60W 60/0025
See application file for complete search history.

(56) References Cited

U.S. PATENT DOCUMENTS

| 2019/0009818 | A1  | 1/2019  | Ide |
|---|---|---|---|
| 2019/0088137 | A1* | 3/2019  | Yamada ..................... B60R 1/12 |
| 2020/0193833 | A1* | 6/2020  | Matsunaga .......... G05D 1/0212 |
| 2020/0385021 | A1  | 12/2020 | Eguchi |
| 2022/0119000 | A1* | 4/2022  | Kanoh ................. B60W 30/143 |
| 2022/0135031 | A1* | 5/2022  | Oniwa .................. B60W 10/20 |
|  |  |  | 701/41 |
| 2022/0135129 | A1* | 5/2022  | Oniwa ................. B62D 15/025 |
|  |  |  | 701/41 |

FOREIGN PATENT DOCUMENTS

| JP | 2003-141694 A | 5/2003 |
|---|---|---|
| JP | 2004-243783 A | 9/2004 |
| JP | 2011-84165 A | 4/2011 |
| JP | 2019-14369 A | 1/2019 |
| JP | 2020-199808 A | 12/2020 |

* cited by examiner

*Primary Examiner* — John Kwon
(74) *Attorney, Agent, or Firm* — Sughrue Mion, PLLC

(57) ABSTRACT

A vehicle driving support device executes lane deviation suppression control when there is a possibility that an own vehicle deviates from a lane and when an execution prohibition condition is not satisfied, and executes the lane deviation suppression control so as to steer the own vehicle such that a behavior parameter representing a behavior of the own vehicle during the execution of the lane deviation suppression control does not exceed a behavior parameter upper limit value. The vehicle driving support device reduces the behavior parameter upper limit value or changes the execution prohibition condition such that the execution prohibition condition is not unlikely to be satisfied when the own vehicle is traveling at a speed equal to or lower than a predetermined speed, compared to when the own vehicle is traveling at a speed higher than the predetermined speed.

5 Claims, 13 Drawing Sheets

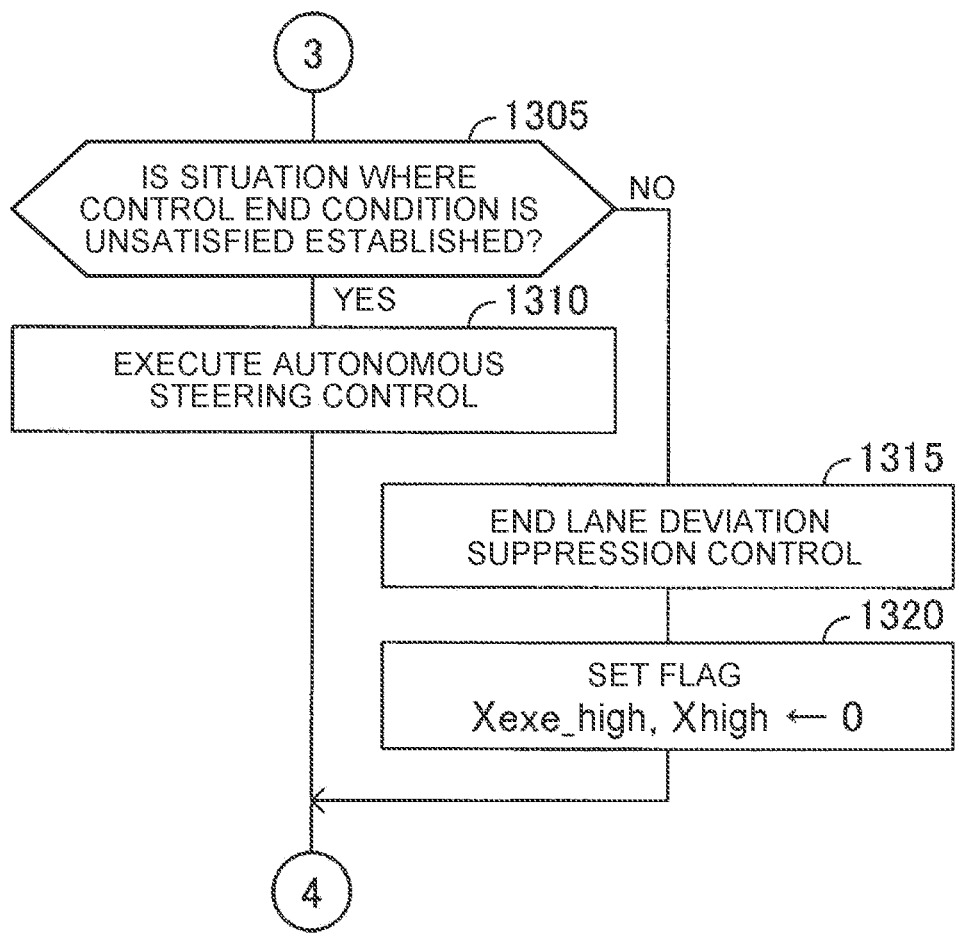

VEHICLE DRIVING SUPPORT DEVICE

CROSS-REFERENCE TO RELATED APPLICATION

This application claims priority to Japanese Patent Application No. 2021-175407 filed on Oct. 27, 2021, incorporated herein by reference in its entirety.

BACKGROUND

1. Technical Field

The present disclosure relates to a vehicle driving support device.

2. Description of Related Art

There is known a vehicle driving support device that executes lane deviation suppression control in which an own vehicle is autonomously steered to suppress the own vehicle from deviating from a lane. Such a vehicle driving support device autonomously steers the own vehicle so that the own vehicle does not deviate outside the lane marking line such as the white line that defines the lane. However, when the own vehicle is traveling on a general road, there are situations where the own vehicle needs to travel beyond the lane marking line, and if the lane deviation suppression control is executed at this time, the driver will not be able to cause the own vehicle to travel as desired.

In view of this, there is known a vehicle driving support device that does not execute the lane deviation suppression control and allows the own vehicle to travel beyond the lane marking line even if the own vehicle may travel beyond the lane marking line and deviate from the lane while the own vehicle is traveling at a low speed (see, for example, Japanese Unexamined Patent Application Publication No. 2020-199808 (JP 2020-199808 A)).

SUMMARY

Since the width of a general road is narrower than that of a highway, if a curb or a wall is provided on the side of the road, the distance between the curb or the wall and the own vehicle is short. It is thus preferable to execute the lane deviation suppression control when the own vehicle may come into contact with such a three-dimensional object (three-dimensional road end) such as a curb or a wall.

However, as mentioned above, the width of a general road is narrower than that of a highway, and the road environment of a general road is different from that of a highway, including cases where another vehicle is stopped ahead of the own vehicle to make a right turn. Therefore, when the own vehicle is traveling on a general road, if the lane deviation suppression control is executed in the same way as when the own vehicle is traveling on a highway, there is a possibility that the traveling safety of the own vehicle cannot be ensured.

Also, even when the vehicle is traveling on a highway, the vehicle may travel at a low speed, such as when there is congestion or when the vehicle is heading for a service area or an exit of the highway. In such a case, if the lane deviation suppression control is executed in the same way as when the own vehicle is traveling on the main lanes of the highway at a high speed, there is a possibility that the traveling safety of the own vehicle cannot be ensured.

Needless to say, the own vehicle may travel at a high speed even when the own vehicle is traveling on a general road, and in such a situation, if the lane deviation suppression control is executed in the same way as when the own vehicle is traveling on a highway, it is unlikely that the traveling safety of the own vehicle cannot be ensured.

In this way, when the own vehicle is traveling at a low speed and the lane deviation suppression control is executed in the same way as when the own vehicle is traveling at a high speed, there is a possibility that the traveling safety of the own vehicle cannot be ensured and that appropriate execution of the lane deviation suppression control cannot not be achieved.

An object of the present disclosure is to provide a vehicle driving support device capable of achieving appropriate lane deviation suppression control when the own vehicle is traveling at a low speed.

A vehicle driving support device according to the present disclosure includes a control device that executes lane deviation suppression control in which an own vehicle is autonomously steered to suppress the own vehicle from deviating from a lane.

The control device is configured to execute the lane deviation suppression control when there is a possibility that the own vehicle deviates from the lane and when an execution prohibition condition is not satisfied, the execution prohibition condition being a condition for prohibiting execution of the lane deviation suppression control based on a steering operation by a driver of the own vehicle, and execute the lane deviation suppression control so as to autonomously steer the own vehicle such that a behavior parameter representing a behavior of the own vehicle during the execution of the lane deviation suppression control does not exceed a behavior parameter upper limit value.

The control device is also configured to reduce the behavior parameter upper limit value or change the execution prohibition condition such that the execution prohibition condition is not unlikely to be satisfied when the own vehicle is traveling at a speed equal to or lower than a predetermined speed, compared to when the own vehicle is traveling at a speed higher than the predetermined speed.

When the own vehicle is traveling at a low speed, the road on which the own vehicle is traveling is often a narrow road, and in such a case, there are often other vehicles, people, etc. near the own vehicle. Thus, when the own vehicle is traveling at a low speed, in order to ensure the traveling safety of the own vehicle, it is preferable to execute the lane deviation suppression control so as not to make a large change in the behavior of the own vehicle, and it is preferable that the lane deviation suppression control is unlikely to be executed.

According to the present disclosure, when the own vehicle is traveling at a speed equal to or lower than a predetermined speed, the behavior parameter upper limit value is reduced, or the execution prohibition condition is changed so as not to be unlikely to be satisfied. Therefore, a large change in the behavior of the own vehicle is avoided when the lane deviation suppression control is executed, and it is difficult to execute the lane deviation suppression control. This makes it possible to achieve execution of appropriate lane deviation suppression control when the own vehicle is traveling at a low speed.

In the vehicle driving support device according to the present disclosure, the behavior parameter is, for example, a lateral movement distance that is a distance by which the own vehicle is moved in a lateral direction by the lane deviation suppression control. Further, the behavior parameter is, for example, at least one of a lateral acceleration, a steering angle, and a yaw rate of the own vehicle.

Further, in the vehicle driving support device according to the present disclosure, the execution prohibition condition is, for example, a condition that a steering operation force equal to or larger than a steering operation force threshold value is being input to the own vehicle by the driver of the own vehicle. In this case, the control device is configured to change the execution prohibition condition such that the execution prohibition condition is not unlikely to be satisfied by setting the steering operation force threshold value to a small value.

Further, in the vehicle driving support device according to the present disclosure, the execution prohibition condition is, for example, a condition that a time elapsed since the execution of the lane deviation suppression control is prohibited due to satisfaction of the execution prohibition condition is shorter than a predetermined time. In this case, the control device is configured to change the execution prohibition condition such that the execution prohibition condition is not unlikely to be satisfied by setting the predetermined time to a long time.

Further, a vehicle driving support device according to the present disclosure includes a control device that executes lane deviation suppression control in which an own vehicle is autonomously steered to suppress the own vehicle from deviating from a lane.

The control device is configured to execute the lane deviation suppression control when there is a possibility that the own vehicle deviates from the lane and when an execution prohibition condition is not satisfied, the execution prohibition condition being a condition for prohibiting execution of the lane deviation suppression control based on a steering operation by a driver of the own vehicle, and execute the lane deviation suppression control so as to autonomously steer the own vehicle such that a behavior parameter representing a behavior of the own vehicle during the execution of the lane deviation suppression control is limited to a value equal to or lower than a behavior parameter upper limit value.

The control device is also configured to reduce the behavior parameter upper limit value or change the execution prohibition condition such that the execution prohibition condition is not unlikely to be satisfied when the own vehicle is traveling on a general road other than a road used exclusively by automobiles, compared to when the own vehicle is traveling on the road used exclusively by automobiles.

Since the width of a general road is narrower than that of a road used exclusively by automobiles, when the own vehicle is traveling on a general road, there are often other vehicles, people, etc. near the own vehicle. Thus, when the own vehicle is traveling on a general road, in order to ensure the traveling safety of the own vehicle, it is preferable to execute the lane deviation suppression control so as not to make a large change in the behavior of the own vehicle, and it is preferable that the lane deviation suppression control is unlikely to be executed.

According to the present disclosure, when the own vehicle is traveling on a general road, the behavior parameter upper limit value is reduced, or the execution prohibition condition is changed so as not to be unlikely to be satisfied. Therefore, a large change in the behavior of the own vehicle is avoided when the lane deviation suppression control is executed, and it is difficult to execute the lane deviation suppression control itself. This makes it possible to achieve execution of appropriate lane deviation suppression control when the own vehicle is traveling on a general road.

The components of the present disclosure are not limited to the embodiment of the present disclosure described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart showing a routine executed by the vehicle driving support device according to the embodiment of the present disclosure.

DETAILED DESCRIPTION OF EMBODIMENTS

Figure 1:
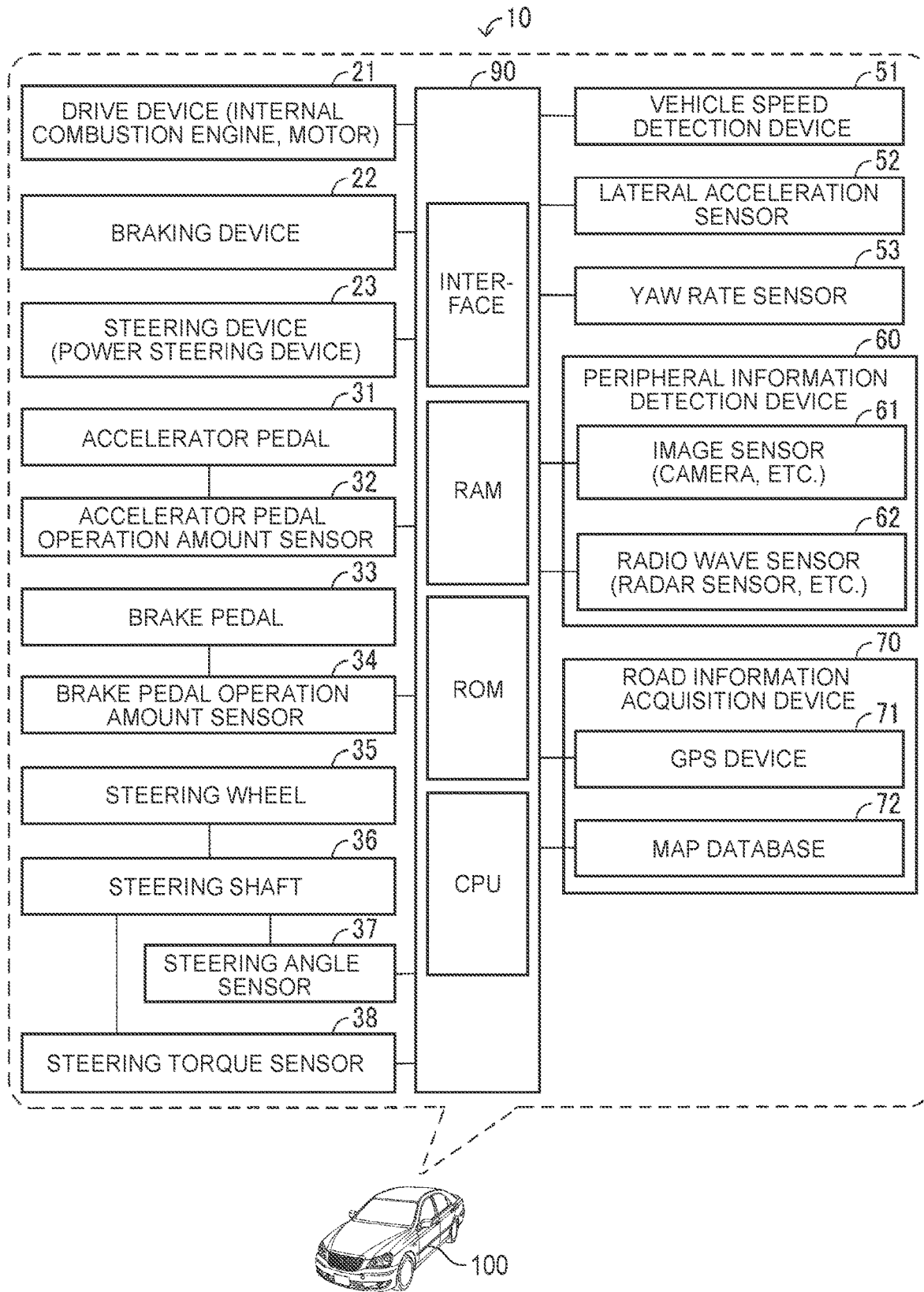
FIG. 1 is a diagram showing a vehicle driving support device according to an embodiment of the present disclosure and a vehicle (an own vehicle) on which the device is mounted.

Hereinafter, a vehicle driving support device according to an embodiment of the present disclosure will be described with reference to the drawings. As shown in FIG. 1, a vehicle driving support device 10 according to the embodiment of the present disclosure is mounted on an own vehicle 100.

ECU

The vehicle driving support device 10 includes an ECU 90 as a control device. The term ECU is an abbreviation for electronic control unit. The ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM.

Drive Device, Etc.

The own vehicle 100 is equipped with a drive device 21, a braking device 22, and a steering device 23.

Drive Device

The drive device 21 is a device that outputs a driving force (driving torque) applied to the own vehicle 100 in order to cause the own vehicle 100 to travel, and is, for example, an internal combustion engine, a motor, or the like. The drive device 21 is electrically connected to the ECU 90. The ECU 90 can control the driving force output from the drive device 21 by controlling the operation of the drive device 21.

Braking Device

The braking device 22 is a device that outputs a braking force (braking torque) applied to the own vehicle 100 in order to brake the own vehicle 100, and is, for example, a hydraulic brake device. The braking device 22 is electrically connected to the ECU 90. The ECU 90 can control the braking force output from the braking device 22 by controlling the operation of the braking device 22.

Steering Device

The steering device 23 is a device that outputs a steering force (steering torque) applied to the own vehicle 100 in order to steer the own vehicle 100, and is, for example, a power steering device. The steering device 23 is electrically connected to the ECU 90. The ECU 90 can control the steering force output from the steering device 23 by controlling the operation of the steering device 23.

Sensors, Etc.

An accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 51, a lateral acceleration sensor 52, a yaw rate sensor 53, a peripheral information detection device 60, and a road information acquisition device 70 are also mounted on the own vehicle 100.

Accelerator Pedal Operation Amount Sensor

The accelerator pedal operation amount sensor 32 is a sensor that detects the operation amount of the accelerator pedal 31. The accelerator pedal operation amount sensor 32 is electrically connected to the ECU 90. The accelerator pedal operation amount sensor 32 transmits information of the detected operation amount of the accelerator pedal 31 to the ECU 90. The ECU 90 acquires the operation amount of the accelerator pedal 31 (accelerator pedal operation amount AP) based on the information.

The ECU 90 acquires a required driving force (required driving torque) by calculation based on the accelerator pedal operation amount AP and the traveling speed (vehicle speed) of the own vehicle 100. The required driving force is the driving force required to be output from the drive device 21. The ECU 90 controls the operation of the drive device 21 so that a driving force corresponding to the required driving force is output.

Brake Pedal Operation Amount Sensor

The brake pedal operation amount sensor 34 is a sensor that detects the operation amount of the brake pedal 33. The brake pedal operation amount sensor 34 is electrically connected to the ECU 90. The brake pedal operation amount sensor 34 transmits information of the detected operation amount of the brake pedal 33 to the ECU 90. The ECU 90 acquires the operation amount of the brake pedal 33 (brake pedal operation amount BP) based on the information.

The ECU 90 acquires the required braking force (required braking torque) by calculation based on the brake pedal operation amount BP. The required braking force is the braking force required to be output from the braking device 22. The ECU 90 controls the operation of the braking device 22 so that a braking force corresponding to the required braking force is output.

Steering Angle Sensor

The steering angle sensor 37 is a sensor that detects the rotation angle of the steering shaft 36 with respect to the neutral position. The steering angle sensor 37 is electrically connected to the ECU 90. The steering angle sensor 37 transmits information of the detected rotation angle of the steering shaft 36 to the ECU 90. The ECU 90 acquires the rotation angle of the steering shaft 36 (steering angle $\theta s$) based on the information.

Steering Torque Sensor

The steering torque sensor 38 is a sensor that detects the torque input to the own vehicle 100 by the driver of the own vehicle 100 (in this example, the torque input to the steering shaft 36 via the steering wheel 35). The steering torque sensor 38 is electrically connected to the ECU 90. The steering torque sensor 38 transmits information of the detected torque to the ECU 90. The ECU 90 acquires the torque (driver steering operation force TQd) input to the steering shaft 36 by the driver via the steering wheel 35 based on the information.

Vehicle Speed Detection Device

The vehicle speed detection device 51 is a device that detects the traveling speed (vehicle speed) of the own vehicle 100, and is, for example, a wheel speed sensor. The vehicle speed detection device 51 is electrically connected to the ECU 90. The vehicle speed detection device 51 transmits information of the detected vehicle speed of the own vehicle 100 to the ECU 90. The ECU 90 acquires the vehicle speed (own vehicle speed V) of the own vehicle 100 based on the information.

The ECU 90 acquires a required steering force (required steering torque) by calculation based on the acquired steering angle $\theta s$, the driver steering operation force TQd, and the own vehicle speed V. The required steering force is the steering force required to be output from the steering device 23. The ECU 90 performs normal steering control for controlling the operation of the steering device 23 so that the steering force corresponding to the required steering force is output from the steering device 23, except when the lane deviation suppression control described later is executed.

Lateral Acceleration Sensor

The lateral acceleration sensor 52 is a sensor that detects the acceleration of the own vehicle 100 in the lateral direction. The lateral acceleration sensor 52 is electrically connected to the ECU 90. The lateral acceleration sensor 52 transmits information of the detected acceleration to the ECU 90. The ECU 90 acquires the acceleration in the lateral direction of the own vehicle 100 (lateral acceleration Gy) based on the information.

Yaw Rate Sensor

The yaw rate sensor 53 is a sensor that detects the yaw rate of the own vehicle 100. The yaw rate sensor 53 is electrically connected to the ECU 90. The yaw rate sensor 53 transmits information of the detected yaw rate to the ECU 90. The ECU 90 acquires the yaw rate (yaw rate $d\theta y$) of the own vehicle 100 based on the information.

Peripheral Information Detection Device

The peripheral information detection device 60 is a device that detects information of the periphery of the own vehicle 100, and in this example, includes an image sensor 61 and a radio wave sensor 62. The image sensor 61 is, for example, a camera. The radio wave sensor 62 is, for example, a radar sensor (millimeter wave radar or the like). The peripheral information detection device 60 may include a sound wave sensor such as an ultrasonic sensor (clearance sonar) or an optical sensor such as a laser radar (LiDAR).

Image Sensor

The image sensor 61 is electrically connected to the ECU 90. The image sensor 61 captures an image of the periphery of the own vehicle 100 and transmits information of the captured image to the ECU 90. The ECU 90 can acquire information (peripheral detection information IS) about the periphery of the own vehicle 100 based on the information (image information II).

Radio Wave Sensor

The radio wave sensor 62 is electrically connected to the ECU 90. The radio wave sensor 62 transmits radio waves and receives radio waves (reflected waves) reflected by an object. The radio wave sensor 62 transmits information (detection result) related to the transmitted radio waves and the received radio waves (reflected waves) to the ECU 90. In other words, the radio wave sensor 62 detects an object existing in the periphery of the own vehicle 100, and transmits information (detection result) related to the detected object to the ECU 90. The ECU 90 can acquire information (peripheral detection information IS) related to the object such as a structure existing in the periphery of the own vehicle 100 based on the information (radio wave information).

Road Information Acquisition Device

The road information acquisition device 70 is a device that acquires information related to the road on which the own vehicle 100 is traveling, and in this example, includes a global positioning system (GPS) device 71 and a map database 72.

GPS Device

The GPS device 71 is a device that receives so-called GPS signals. The GPS device 71 is electrically connected to the ECU 90. The GPS device 71 transmits the received GPS signals to the ECU 90. The ECU 90 acquires the current position of the own vehicle 100 (the position of the own vehicle 100 in the GPS coordinate system) based on the received GPS signals.

Map Database

The map database 72 is a database of map information. The map database 72 is electrically connected to the ECU 90. The ECU 90 collates the current position of the own vehicle 100 acquired based on the GPS signals with the map information of the map database 72, and determines whether the road on which the own vehicle 100 is traveling is a general road or a road used exclusively by automobiles.

Outline of Operation of Vehicle Driving Support Device

Figure 2:
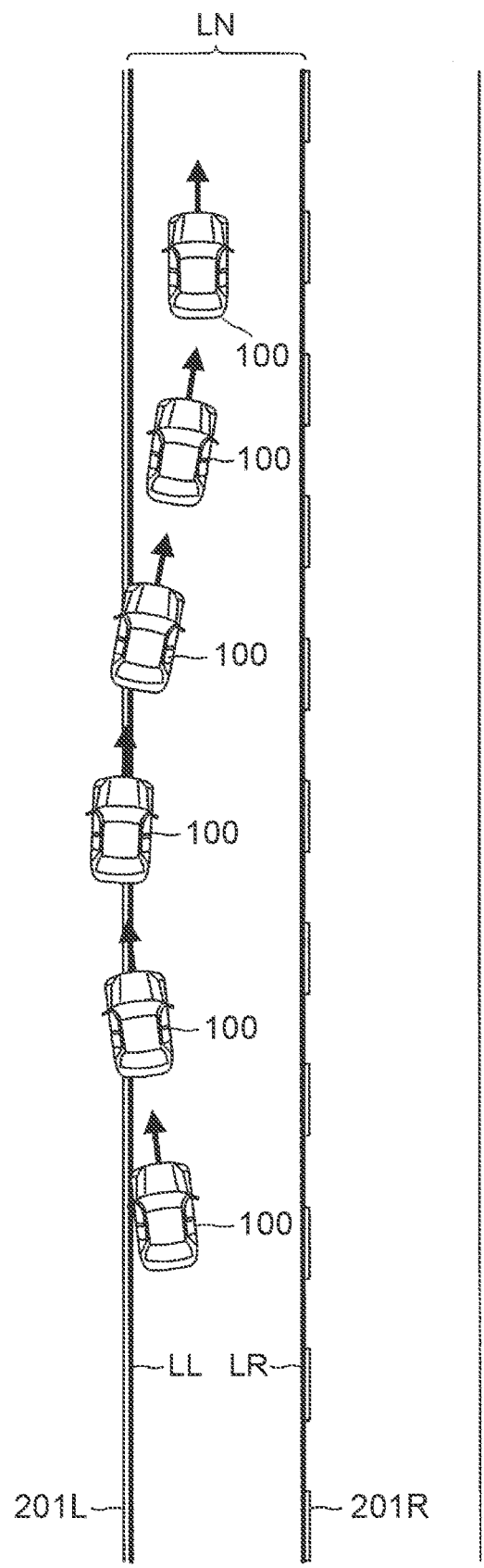
FIG. 2 is a diagram showing a situation in which lane deviation suppression control is executed.

Next, the outline of the operation of the vehicle driving support device 10 will be described. When a lane deviation condition indicating that the own vehicle 100 may deviate from the current lane LN is satisfied while the own vehicle 100 is traveling, the vehicle driving support device 10 executes the lane deviation suppression control for suppressing the own vehicle 100 from deviating from the current lane LN by autonomously steering the own vehicle 100 as shown in FIG. 2, on condition that a cancellation condition (execution prohibition condition) described later is not satisfied.

The vehicle driving support device 10 sets a left side deviation determination line LL and a right side deviation determination line LR, and when the own vehicle 100 reaches the left side deviation determination line LL or the right side deviation determination line LR, it is determined that the lane deviation condition is satisfied.

The left side deviation determination line LL is a line extending along the left end of the current lane LN, and the vehicle driving support device 10 sets, as the left side deviation determination line LL, a line extending along "a left side lane marking line 201L (flat road end)", "a boundary between soil, grass, gravel, etc. and the road (flat road end) if there is soil, grass, gravel, etc. on the left side of the current lane LN", and "a boundary between a curb, guardrail, wall (fence), bushes, grooves, pylons, etc. and the road (three-dimensional road end), if there is(are) a curb, guardrail, wall (fence), bushes, grooves, pylons, etc., on the left side of the current lane LN".

When the vehicle driving support device 10 sets the line extending along the flat road end as the left side deviation determination line LL, the vehicle driving support device 10 sets the line on the flat road end as the left side deviation determination line LL, but when the line extending along the three-dimensional road end is set as the left side deviation determination line LL, the vehicle driving support device 10 sets the line distanced to the right side by a predetermined distance from the three-dimensional road end as the left side deviation determination line LL.

In the example shown in FIG. 2, the line on the left side lane marking line 201L is set as the left side deviation determination line LL.

Figure 3:
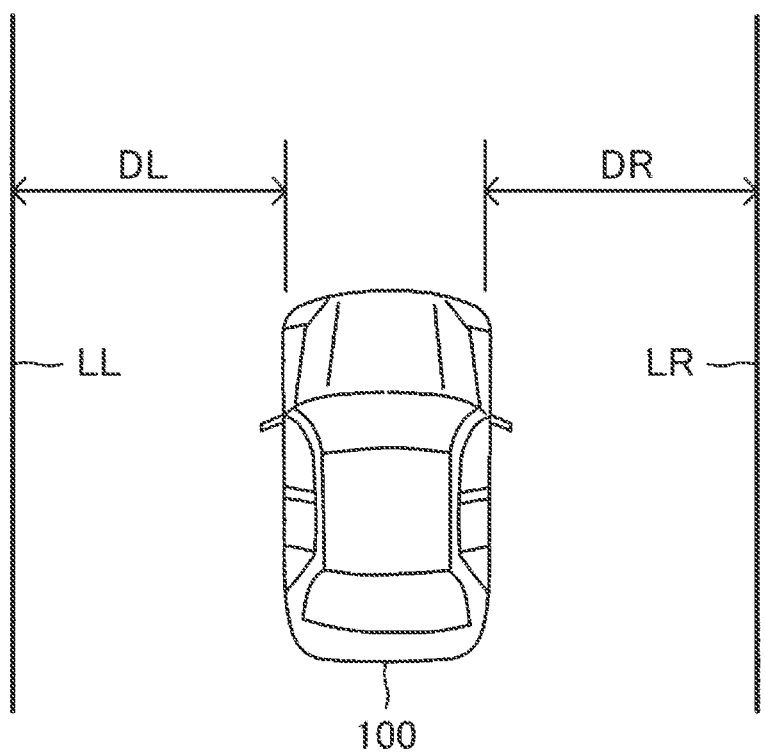
FIG. 3 is a diagram showing a left-side distance and a right-side distance.

The vehicle driving support device 10 determines that the lane deviation condition is satisfied when a left side distance DL becomes zero while the own vehicle 100 is traveling. As shown in FIG. 3, the left side distance DL is the distance between the left side front end portion of the own vehicle 100 and the left side deviation determination line LL.

Similarly, the right side deviation determination line LR is a line extending along the right end of the current lane LN, and the vehicle driving support device 10 sets, as the right side deviation determination line LR, a line extending along "a right side lane marking line 201R (flat road end)", "a boundary between soil, grass, gravel, etc. and the road (flat road end) if there is soil, grass, gravel, etc. on the right side of the current lane LN", and "a boundary between a curb, guardrail, wall (fence), bushes, grooves, pylons, etc. and the road (three-dimensional road end), if there is(are) a curb, guardrail, wall (fence), bushes, grooves, pylons, etc., on the right side of the current lane LN".

When the vehicle driving support device 10 sets the line extending along the flat road end as the right side deviation determination line LR, the vehicle driving support device 10 sets the line on the flat road end as the right side deviation determination line LR, but when the line extending along the three-dimensional road end is set as the right side deviation determination line LR, the vehicle driving support device 10 sets the line distanced to the left side by a predetermined distance from the three-dimensional road end as the right side deviation determination line LR.

In the example shown in FIG. 2, the line on the right side lane marking line 201R is set as the right side deviation determination line LR.

The vehicle driving support device 10 determines that the lane deviation condition is satisfied when a right side distance DR becomes zero while the own vehicle 100 is traveling. As shown in FIG. 3, the right side distance DR is the distance between the right side front end portion of the own vehicle 100 and the right side deviation determination line LR.

The vehicle driving support device 10 acquires a flat road end and a three-dimensional road end based on the peripheral detection information IS.

Figure 4:
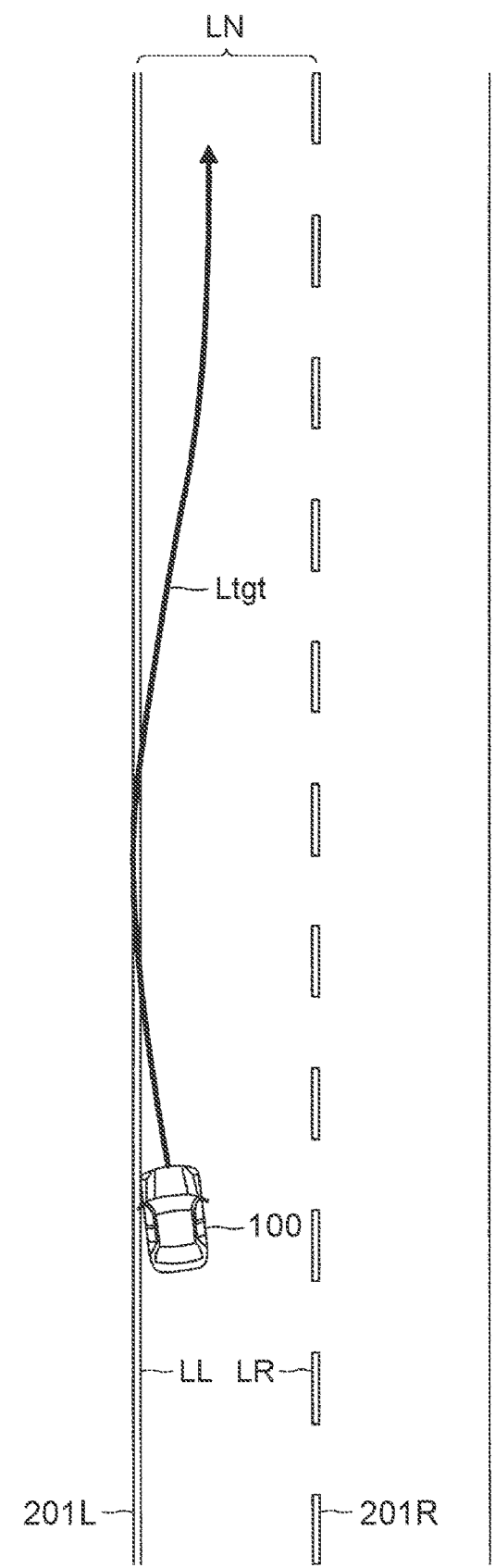
FIG. 4 is a diagram showing a target traveling route set by the lane deviation suppression control.

When the lane deviation condition is satisfied and the lane deviation suppression control is started in the situation where the cancellation condition is not satisfied, the vehicle driving support device 10 sets a route (target traveling route Ltgt) for causing the own vehicle 100 to travel by the lane deviation suppression control based on factors such as the own vehicle speed V and the determination line intersection angle θcross, and autonomously steers the own vehicle 100 so that the own vehicle 100 travels along the target traveling route Ltgt as shown in FIG. 4. The determination line intersection angle θcross is the angle defined by the longitudinal center line of the own vehicle 100 (the line extending in the front-rear direction of the own vehicle 100 through the center of the width of the own vehicle 100) and the left side deviation determination line LL or the right side deviation determination line LR.

Further, the vehicle driving support device 10 sets an upper limit value (behavior parameter upper limit value Pmax) for a parameter (behavior parameter P) representing the behavior of the own vehicle 100 when the own vehicle 100 is autonomously steered by the lane deviation suppression control, and sets the target traveling route Ltgt so that the behavior parameter P does not exceed the behavior parameter upper limit value Pmax. In this example, the behavior parameter P is the lateral movement distance Dy (lateral movement amount), the lateral acceleration Gy, the steering angle θs, and the yaw rate dθy of the own vehicle 100.

Figure 5:
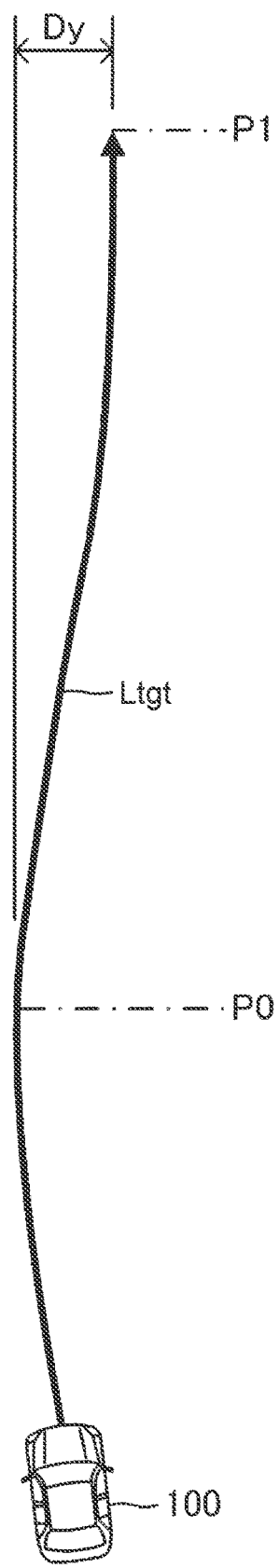
FIG. 5 is a diagram showing a lateral movement distance of the own vehicle by the lane deviation suppression control.

As shown in FIG. 5, the lateral movement distance Dy is the distance that the own vehicle 100 moves in the lateral direction (width direction) of the current lane LN from the point where the own vehicle 100 deviates most outward from the left side deviation determination line LL (point P0 shown in FIG. 5) until the own vehicle 100 is returned to the current lane LN and the lane deviation suppression control is terminated (point P1 shown in FIG. 5).

The vehicle driving support device 10 steers the own vehicle 100 so that the behavior parameter P does not exceed the behavior parameter upper limit value Pmax while the own vehicle 100 is autonomously steered by the lane deviation suppression control.

Cancellation Condition (Execution Prohibition Condition)

The driver may intentionally attempt to cause the own vehicle 100 to travel beyond the left side deviation determination line LL or the right side deviation determination line LR. At this time, the driver steering operation force TQd becomes relatively large. It is thus desirable not to execute the lane deviation suppression control when the driver steering operation force TQd is relatively large even when the lane deviation condition is satisfied, and it is desirable to stop the lane deviation suppression control when a relatively large driver steering operation force TQd is input to the own vehicle 100 during execution of the lane deviation suppression control.

In view of this, the vehicle driving support device 10 sets a condition that the driver steering operation force TQd is equal to or larger than a predetermined value (steering operation force threshold value TQd_th) as a cancellation condition (execution prohibition condition). When the lane deviation condition is satisfied while the cancellation condition is satisfied, the vehicle driving support device 10 does not execute the lane deviation suppression control, but when the cancellation condition is satisfied during a period from the start of the lane deviation suppression control to the termination of the lane deviation suppression control, the vehicle driving support device 10 stops the lane deviation suppression control that is being executed.

Further, in this example, when the lane deviation condition is satisfied but the lane deviation suppression control is not executed because the cancellation condition is satisfied, the vehicle driving support device 10 is configured not to execute the lane deviation suppression control even when the lane deviation condition is satisfied in a situation where the cancellation condition is not satisfied, from the time point from when the lane deviation suppression control was not executed until a predetermined time (cancellation duration threshold value Tth) elapses.

Furthermore, when the vehicle driving support device 10 stops the lane deviation suppression control because the cancellation condition is satisfied during the execution of the lane deviation suppression control, the vehicle driving support device 10 is configured not to execute the lane deviation suppression control even when the lane deviation condition is satisfied in a situation where the cancellation condition is not satisfied, from the time point when the lane deviation suppression control is stopped until the cancellation duration threshold value Tth elapses.

Setting of Behavior Parameter Upper Limit Value

There are roughly two types of roads, which are general roads and roads used exclusively by automobiles including highways. The width of general roads is narrower than that of roads used exclusively by automobiles, and other vehicles and people are often present near the own vehicle 100 on general roads. Therefore, when the own vehicle 100 is autonomously steered by the lane deviation suppression control while the own vehicle 100 is traveling on a general road, it is preferable that the own vehicle 100 is steered so as not to make a large change in the behavior of the own vehicle 100 or that the own vehicle 100 is steered so that the own vehicle 100 does not move significantly in the lateral direction (the width direction of the current lane LN), in order to ensure the traveling safety of the own vehicle 100.

Thus, when the own vehicle speed V is higher than the predetermined speed Vth, the vehicle driving support device 10 sets the behavior parameter upper limit value Pmax to a reference value (high-speed behavior parameter upper limit value Plarge), but when the own vehicle speed V is equal to or lower than the predetermined speed Vth, the vehicle driving support device 10 sets the behavior parameter upper limit value Pmax to a predetermined value smaller than the high-speed behavior parameter upper limit value Plarge (low-speed behavior parameter upper limit value Psmall). When the own vehicle 100 is traveling on a road used exclusively by automobiles, the vehicle driving support device 10 may set the behavior parameter upper limit value Pmax to the high-speed behavior parameter upper limit Plarge, and when the own vehicle 100 is traveling on a general road, the vehicle driving support device 10 may set the behavior parameter upper limit value Pmax to the low-speed behavior parameter upper limit value Psmall.

More specifically, in this example, when the own vehicle speed V is higher than the predetermined speed Vth, the vehicle driving support device 10 sets an upper limit value (lateral movement distance upper limit value Dy_max) of the lateral movement distance Dy (lateral movement amount) of the own vehicle 100 to the reference value (high-speed lateral movement distance upper limit value Dy_large), sets the upper limit value (lateral acceleration upper limit value Gy_max) of the lateral acceleration Gy of the own vehicle 100 to the reference value (high-speed lateral acceleration upper limit value Gy_large), sets the upper limit value (steering angle upper limit value θs_max) of the steering angle θs of the own vehicle 100 to the reference value (high-speed steering angle upper limit value θs_large), and sets the upper limit value (yaw rate upper limit value dθy_max) of the yaw rate dθy of the own vehicle 100 to the reference value (high-speed yaw rate upper limit value dθy_large).

Then, the vehicle driving support device 10 sets the target traveling route Ltgt so that the behavior parameter P of the own vehicle 100 when the own vehicle 100 is autonomously steered by the lane deviation suppression control does not exceed the high-speed behavior parameter upper limit value Plarge, and autonomously steers the own vehicle 100 so that the own vehicle 100 travels along the target traveling route Ltgt.

On the other hand, when the own vehicle speed V is equal to or lower than the predetermined speed Vth, the vehicle driving support device 10 sets the lateral movement distance upper limit value Dy_max to a predetermined value (low-speed lateral movement distance upper limit value Dy_small) smaller than the high-speed lateral movement distance upper limit value Dy_large, sets the lateral acceleration upper limit value Gy_max to a predetermined value (low-speed lateral acceleration upper limit value Gy_small) smaller than the high-speed lateral acceleration upper limit value Gy_large, sets the steering angle upper limit value θs_max to a predetermined value (low-speed steering angle upper limit value θs_small) smaller than the high-speed steering angle upper limit value θs_large, and sets the yaw rate upper limit value dθy_max to a predetermined value (low-speed yaw rate upper limit value dθy_small) smaller than the high-speed yaw rate upper limit value dθy_large.

Then, the vehicle driving support device 10 sets the target traveling route Ltgt so that the behavior parameter P of the own vehicle 100 when the own vehicle 100 is autonomously steered by the lane deviation suppression control does not exceed the low-speed behavior parameter upper limit value Psmall, and autonomously steers the own vehicle 100 so that the own vehicle 100 travels along the target traveling route Ltgt.

Accordingly, when the own vehicle 100 is traveling at a low speed, a large change in the behavior of the own vehicle 100 or a large movement of the own vehicle 100 in the lateral direction (the width direction of the current lane LN) due to the lane deviation suppression control is avoided and the traveling safety of the own vehicle 100 is ensured. This makes it possible to achieve execution of appropriate lane deviation suppression control when the own vehicle 100 is traveling at a low speed.

Setting of Cancellation Condition (Setting of Steering Operation Force Threshold Value)

As mentioned above, the driver may intentionally attempt to cause the own vehicle 100 to travel beyond the left side deviation determination line LL or the right side deviation determination line LR. At this time, the driver steering operation force TQd becomes relatively large. It is thus desirable not to execute the lane deviation suppression control when the driver steering operation force TQd is relatively large even when the lane deviation condition is satisfied, and it is desirable to stop the lane deviation suppression control when a relatively large driver steering operation force TQd is input to the own vehicle 100 during execution of the lane deviation suppression control.

In this case, when the own vehicle 100 is traveling on a general road, the driver may intentionally attempt to cause the own vehicle 100 to travel beyond the left side deviation determination line LL or the right side deviation determination line LR even if the driver steering operation force TQd is smaller than when the own vehicle 100 is traveling on a road used exclusively by automobiles.

Thus, when the own vehicle speed V is higher than the predetermined speed Vth, the vehicle driving support device 10 sets the steering operation force threshold value TQd_th to a reference value (high-speed steering operation force threshold value TQd_large), but when the own vehicle speed V is equal to or lower than the predetermined speed Vth, the vehicle driving support device 10 sets the steering operation force threshold value TQd_th to a predetermined value (low-speed steering operation force threshold value TQd_small) smaller than the high-speed steering operation force threshold value TQd_large. When the own vehicle 100 is traveling on a road used exclusively by automobiles, the vehicle driving support device 10 may set the steering operation force threshold value TQd_th to the high-speed steering operation force threshold value TQd_large, and when the own vehicle 100 is traveling on a general road, the vehicle driving support device 10 may set the steering operation force threshold value TQd_th to the low-speed steering operation force threshold value TQd_small.

Accordingly, when the own vehicle 100 is traveling at a low speed, the lane deviation suppression control is not executed and the lane deviation suppression control that is being executed is stopped even when the driver steering operation force TQd is small. This makes it possible to achieve execution of appropriate lane deviation suppression control when the own vehicle 100 is traveling at a low speed.

Setting of Cancellation Duration Threshold Value

Figure 6:
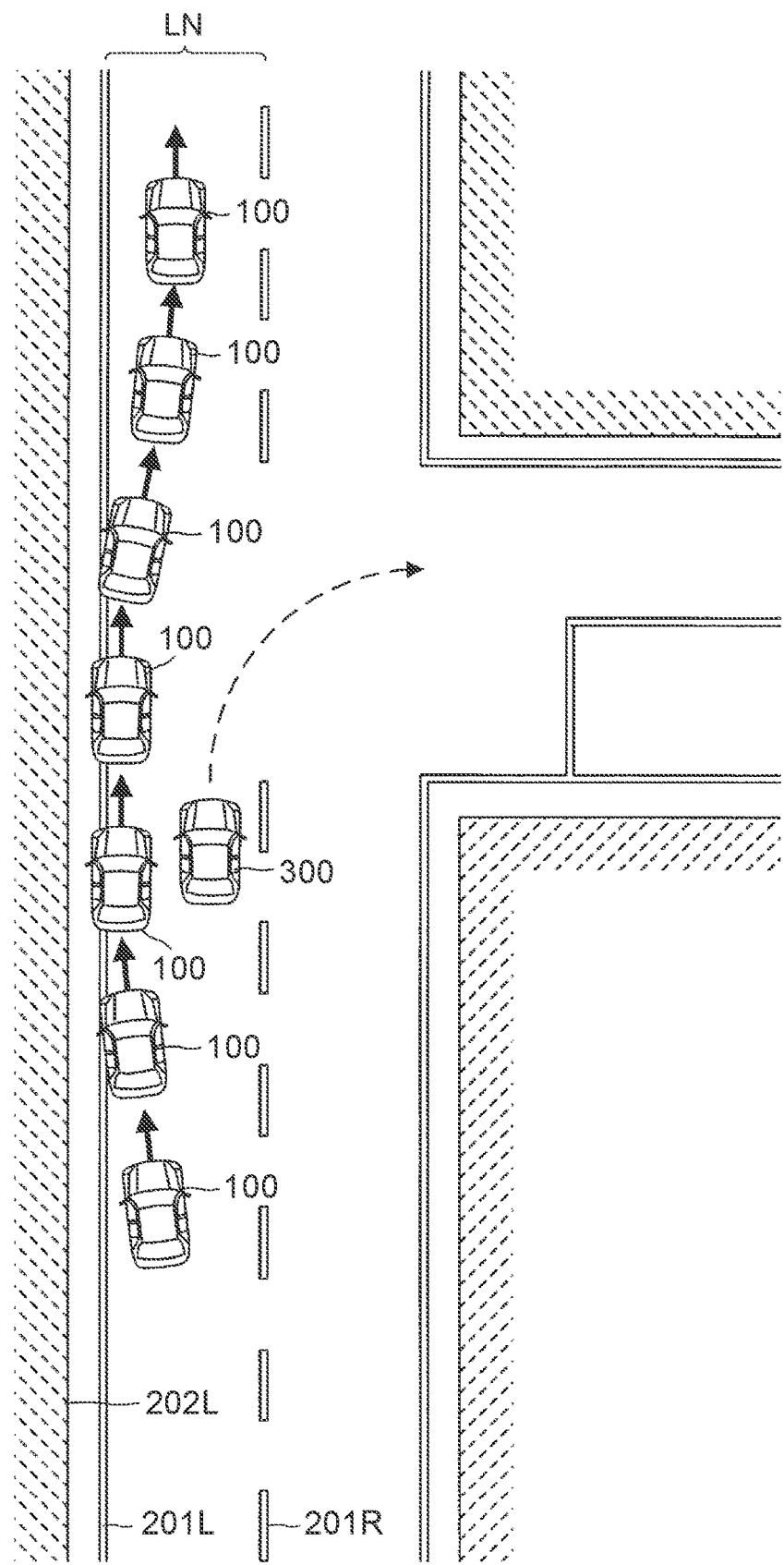
FIG. 6 is a diagram showing a situation in which the own vehicle overtakes a vehicle waiting for a right turn.
Figure 7:
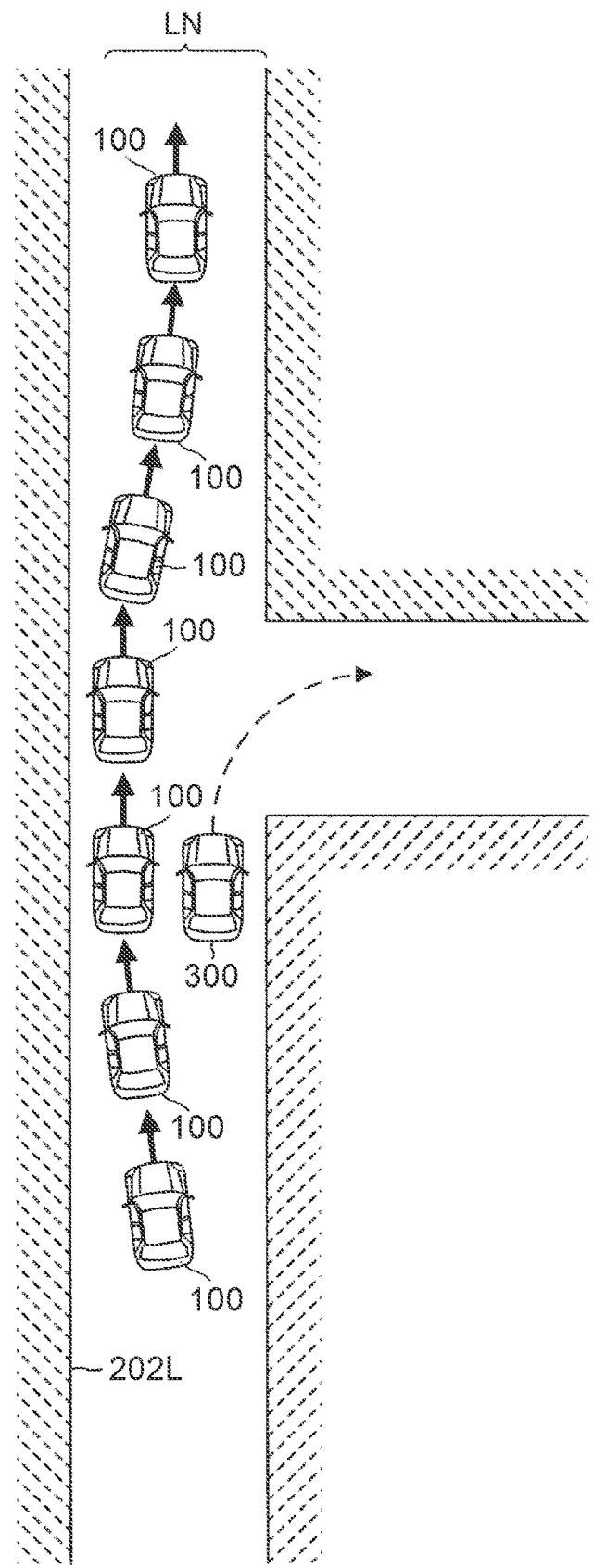
FIG. 7 is a diagram showing a situation in which the own vehicle overtakes a vehicle waiting for a right turn.

For example, while the own vehicle 100 is traveling on a general road, as shown in FIGS. 6 and 7, when the own vehicle 100 approaches the curb 202L on the left side of the road to overtake a right turn standby vehicle 300 (another vehicle that is stopped to make a right turn), but the cancellation condition is satisfied and the lane deviation suppression control is not executed, it takes a certain amount of time from when the cancellation condition is satisfied until the own vehicle 100 overtakes the right turn standby vehicle 300, travels away from the curb 202L, and returns to the current lane LN. In such a situation, if the cancellation duration threshold value Tth is set to a short time, the lane deviation condition may be satisfied before the own vehicle 100 overtakes the right turn standby vehicle 300, which executes the lane deviation suppression control.

Thus, when the own vehicle speed V is higher than the predetermined speed Vth, the vehicle driving support device 10 sets the cancellation duration threshold value Tth to a reference value (high-speed cancellation duration threshold value Tshort), and when the own vehicle speed V is equal to or lower than the predetermined speed Vth, the vehicle driving support device 10 sets the cancellation duration threshold value Tth to a predetermined value (low-speed cancellation duration threshold value Tlong) larger than the high-speed cancellation duration threshold value Tshort. When the own vehicle 100 is traveling on a road used exclusively by automobiles, the vehicle driving support device 10 may set the cancellation duration threshold value Tth to the high-speed cancellation duration threshold value Tshort, and when the own vehicle 100 is traveling on a general road, the vehicle driving support device 10 may set the cancellation duration threshold value Tth to the low-speed cancellation duration threshold value Tlong.

Accordingly, while the own vehicle 100 is traveling at a low speed, when the lane deviation suppression control is not executed because the lane deviation condition is satisfied but the cancellation condition is satisfied or when the lane deviation suppression control is stopped because the cancellation condition was satisfied during the execution of the lane deviation suppression control, the lane deviation suppression control is not executed until a relatively long time elapses. This makes it possible to achieve execution of appropriate lane deviation suppression control when the own vehicle 100 is traveling at a low speed.

Setting of Lane Deviation Condition

When the own vehicle 100 is traveling on a general road, as shown in FIGS. 6 and 7, the own vehicle 100 may travel toward the left side of the current lane LN to overtake the right turn standby vehicle 300, and at this time, the own vehicle 100 may travel beyond the left side lane marking line 201L. In this case, if the lane deviation suppression control is executed because the own vehicle 100 has traveled beyond the left side lane marking line 201L, the own vehicle 100 cannot smoothly overtake the right turn standby vehicle 300.

Figure 8:
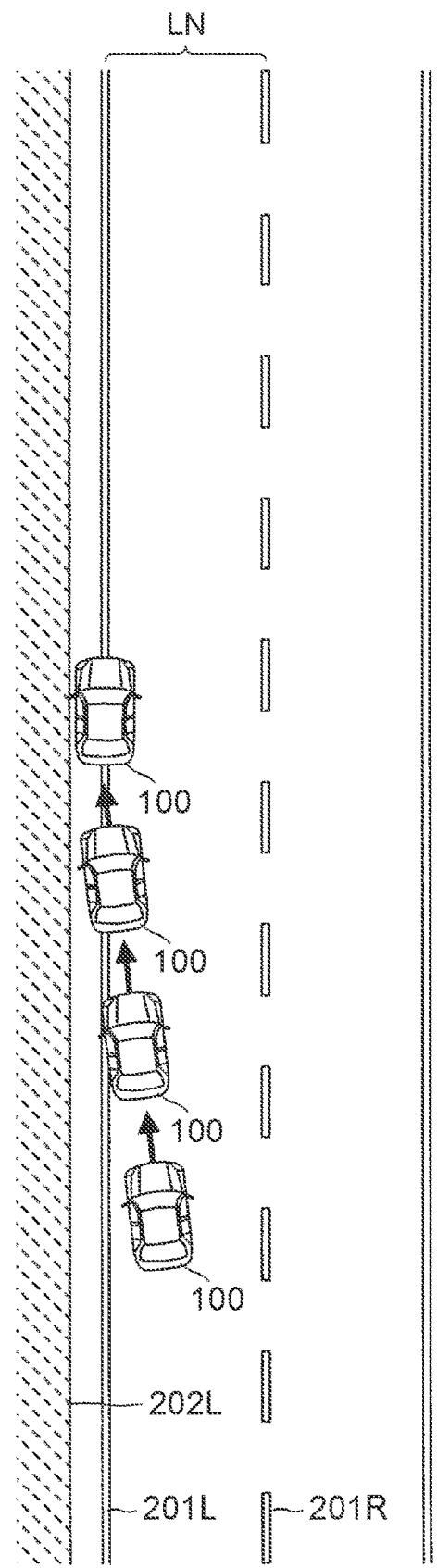
FIG. 8 is a diagram showing a situation in which the own vehicle is stopped on a shoulder of a road.

Further, when the own vehicle 100 is traveling on a general road, as shown in FIG. 8, the driver may stop the own vehicle 100 on the shoulder on the left side of the current lane LN. At this time as well, the own vehicle 100 may travel beyond the left side lane marking line 201L. In this case, if the lane deviation suppression control is executed because the own vehicle 100 has traveled beyond the left side lane marking line 201L, the driver cannot smoothly stop the own vehicle 100 on the shoulder.

In addition to the above, there are cases where the driver intentionally causes the own vehicle 100 to travel beyond the flat road end such as the left side lane marking line 201L or the right side lane marking line 201R while the own vehicle 100 is traveling on a general road. If the lane deviation suppression control is executed at such a time, the lane deviation suppression control is unnecessarily executed.

Thus, the vehicle driving support device 10 may be configured to set the left side deviation determination line LL and the right side deviation determination line LR based on both the flat road end and the three-dimensional road end and determine whether the lane deviation condition is satisfied regardless of whether the own vehicle speed V is high or low. However, in this example, the vehicle driving support device 10 is configured to set the left side deviation determination line LL and the right side deviation determination line LR based on both the flat road end and the three-dimensional road end and determine whether the lane deviation condition is satisfied when the own vehicle speed V is higher than the predetermined speed Vth, but is configured to set the left side deviation determination line LL and the right side deviation determination line LR based only on the three-dimensional road end when the own vehicle speed V is equal to or lower than the predetermined speed Vth.

Accordingly, when the own vehicle 100 is traveling at a low speed, the lane deviation suppression control is not executed even if the own vehicle 100 travels beyond a flat road end such as the left side lane marking line 201L or the right side lane marking line 201R. This makes it possible to achieve execution of appropriate lane deviation suppression control when the own vehicle 100 is traveling at a low speed.

The above is the outline of the operation of the vehicle driving support device 10.

Specific Operation of Vehicle Driving Support Device

Figure 9:
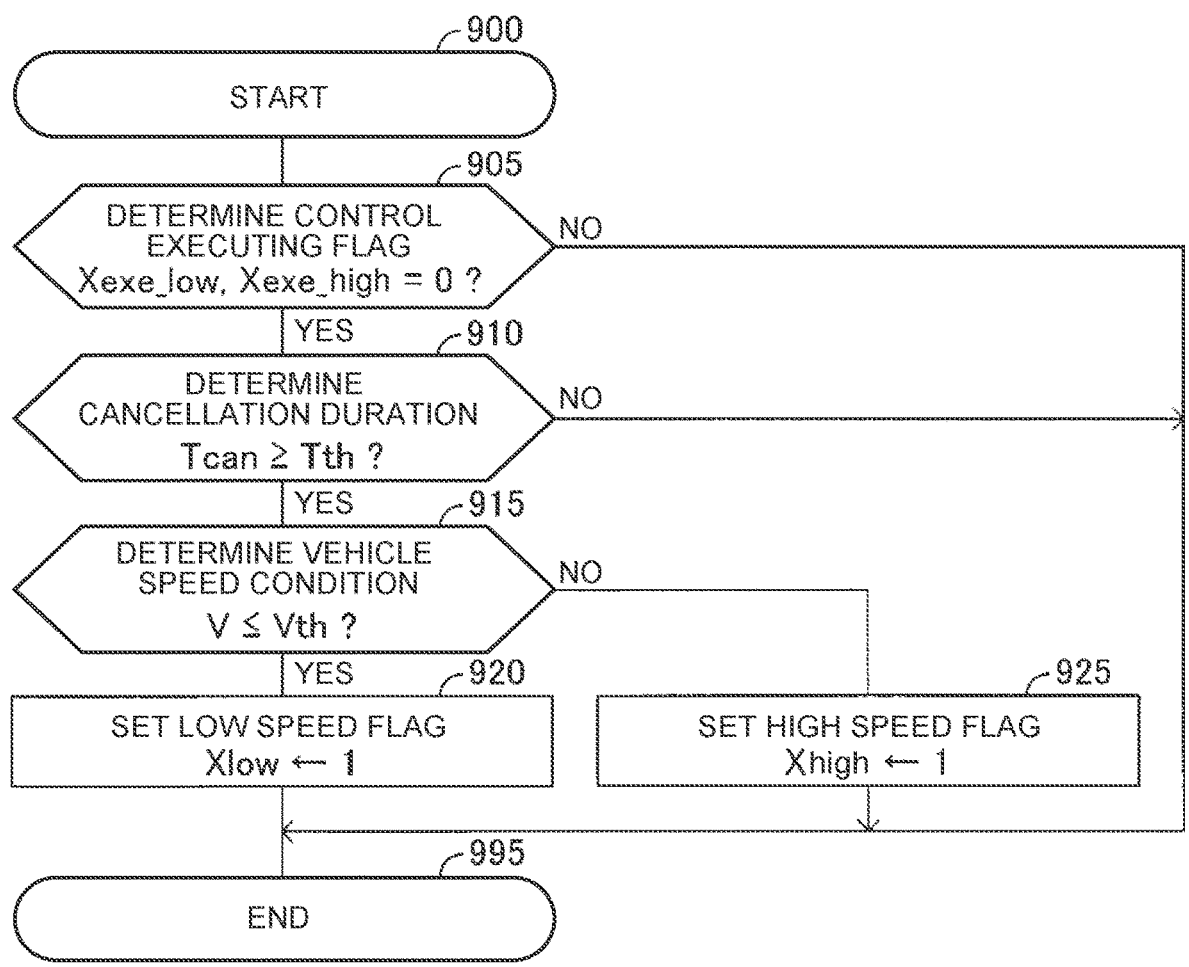
FIG. 9 is a flowchart showing a routine executed by the vehicle driving support device according to the embodiment of the present disclosure.

Next, the specific operation of the vehicle driving support device 10 will be described. The CPU of the ECU 90 of the vehicle driving support device 10 executes the routine shown in FIG. 9 at a predetermined calculation cycle. Thus, at a predetermined timing, the CPU starts the process from step 900 of the routine shown in FIG. 9, and advances the process to step 905 to determine whether the values of the low-speed control executing flag Xexe_low and the high-speed control executing flag Xexe_high are "0".

When the value of the low-speed control executing flag Xexe_low is "1", it indicates that the lane deviation suppression control that has been started while the own vehicle speed V is equal to or lower than the predetermined speed Vth is being executed, and when the value is "0", it indicates that such lane deviation suppression control is not being executed. Further, when the value of the high-speed control executing flag Xexe_high is "1", it indicates that the lane deviation suppression control that has been started while the own vehicle speed V is higher than the predetermined speed Vth is being executed, and when the value is "0", it indicates that such lane deviation suppression control is not being executed.

When the CPU determines "Yes" in step 905, the CPU advances the process to step 910 to determine whether the cancellation duration Tcan is equal to or larger than the cancellation duration threshold value Tth. The cancellation duration Tcan is the time elapsed from the time when the lane deviation suppression control was not executed in the case where the lane deviation suppression control is not executed because the lane deviation condition is satisfied but the cancellation condition is satisfied. The cancellation duration Tcan is also the time elapsed from the time when the lane deviation suppression control is stopped in the case where the lane deviation suppression control is stopped because the cancellation condition was satisfied during the execution of the lane deviation suppression control.

When the CPU determines "Yes" in step 910, the CPU advances the process to step 915 to determine whether the own vehicle speed V is equal to or lower than the predetermined speed Vth. When the CPU determines "Yes" in step 915, the CPU advances the process to step 920 to set the value of the low speed flag Xlow to "1". When the value of the low speed flag Xlow is "1", it indicates that the own vehicle speed V is equal to or lower than the predetermined speed Vth, and when the value of the low speed flag Xlow is "0", it indicates that the own vehicle speed V is not equal to or lower than the predetermined speed Vth. When the CPU executes the process of step 920, the CPU advances the process to step 995 to temporarily end the processes of this routine.

On the other hand, when the CPU determines "No" in step 915, the CPU advances the process to step 925 to set the value of the high speed flag)(high to "1". When the value of the high speed flag Xhigh is "1", it indicates that the own vehicle speed V is higher than the predetermined speed Vth, and when the value of the high speed flag Xhigh is "0", it indicates that the own vehicle speed V is not higher than the predetermined speed Vth. When the CPU executes the process of step 925, the CPU advances the process to step 995 to temporarily end the processes of this routine.

When the CPU determines "No" in step 905 or step 910, the CPU directly advances the process to step 995 to temporarily end the processes of this routine.

Figure 10:
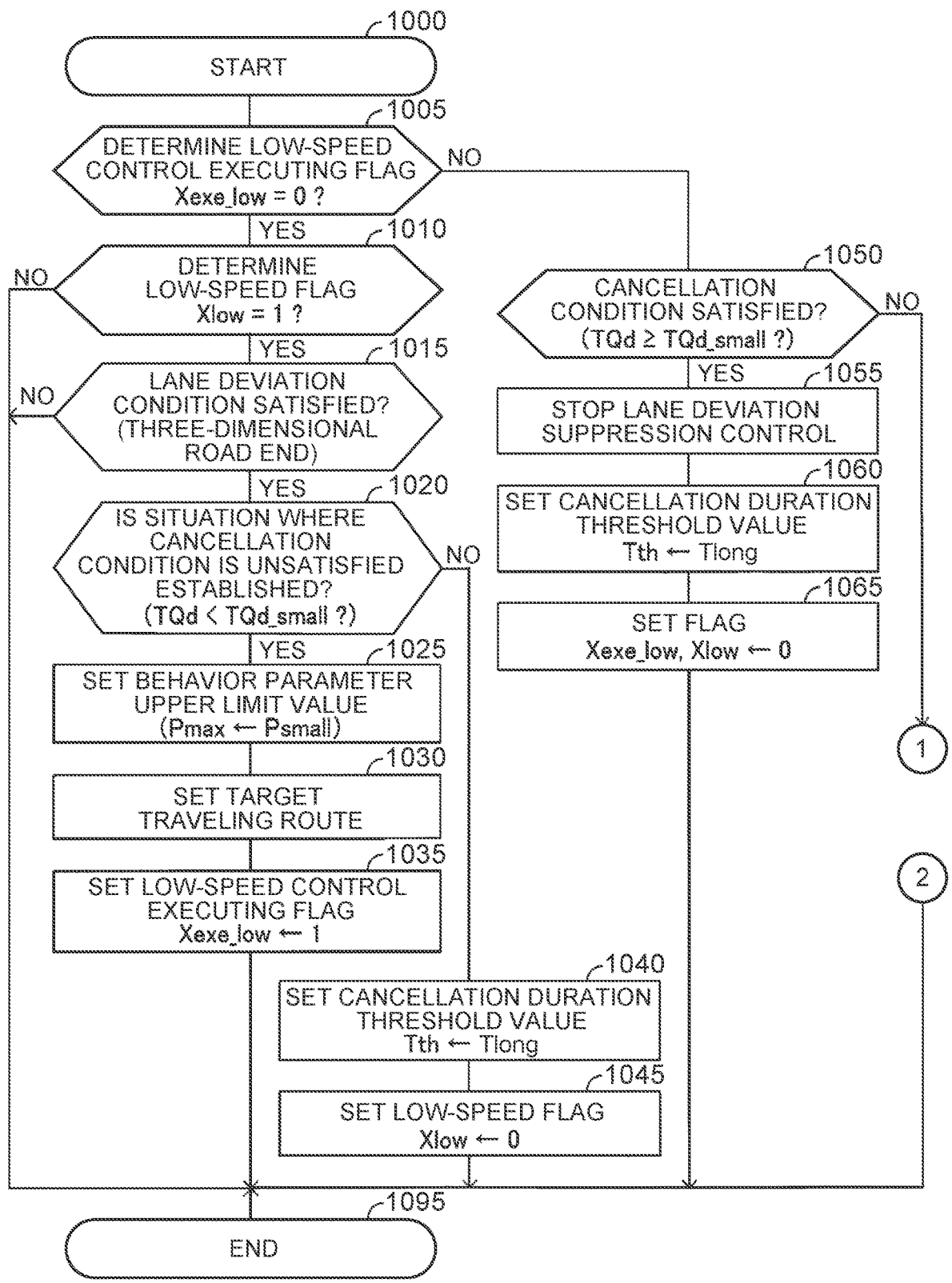
FIG. 10 is a flowchart showing a routine executed by the vehicle driving support device according to the embodiment of the present disclosure.

The CPU further executes the routine shown in FIG. 10 at a predetermined calculation cycle. Thus, at a predetermined timing, the CPU starts the process from step 1000 of the routine shown in FIG. 10, and advances the process to step 1005 to determine whether the value of the low-speed control executing flag Xexe_low is "0".

When the CPU determines "Yes" in step 1005, the CPU advances the process to step 1010 to determine whether the value of the low-speed flag Xlow is "1". When the CPU determines "Yes" in step 1010, the CPU advances the process to step 1015 to determine whether the lane deviation condition is satisfied. As described above, here, since the own vehicle speed V is equal to or lower than the predetermined speed Vth, the CPU determines whether the lane deviation condition is satisfied for the left side deviation determination line LL and the right side deviation determination line LR set based on the three-dimensional road end.

When the CPU determines "Yes" in step 1015, the CPU advances the process to step 1020 to set the steering operation force threshold value TQd_th to the low-speed steering operation force threshold value TQd_small and determine whether the driver steering operation force TQd is smaller than the low-speed steering operation threshold value TQd_small, that is, whether the situation where the cancellation condition is unsatisfied is established. When the CPU determines "Yes" in step 1020, the CPU advances the process to step 1025 to set the behavior parameter upper limit value Pmax to the low-speed behavior parameter upper limit value Psmall. Next, the CPU advances the process to step 1030 to set the target traveling route Ltgt using the low-speed behavior parameter upper limit value Psmall set in step 1025. Subsequently, the CPU advances the process to step 1035 to set the value of the low-speed control executing flag Xexe_low to "1". As a result, the determination result in step 1005 will be "No". When the CPU executes the process of step 1035, the CPU advances the process to step 1095 to temporarily end the processes of this routine.

On the other hand, when the CPU determines "No" in step 1020, the CPU advances the process to step 1040 to set the cancellation duration threshold value Tth to the low-speed cancellation duration threshold value Tlong. Next, the CPU advances the process to step 1045 to set the value of the low speed flag Xlow to "0". Subsequently, the CPU advances the process to step 1095 to temporarily end the processes of this routine.

When the CPU determines "No" in step 1010 or step 1015, the CPU directly advances the process to step 1095 to temporarily end the processes of this routine.

When the CPU determines "No" in step 1005, the CPU advances the process to step 1050 to set the steering operation force threshold value TQd_th to the low-speed steering operation force threshold value TQd_small and determine whether the driver steering operation force TQd is equal to or larger than the low-speed steering operation threshold value TQd_small, that is, whether the cancellation condition is satisfied. When the CPU determines "Yes" in step 1050, the CPU advances the process to step 1055 to stop the lane deviation suppression control. Next, the CPU advances the process to step 1060 to set the cancellation duration threshold value Tth to the low-speed cancellation duration threshold value Tlong. Then, the CPU advances the process to step 1065 to set each of the values of the low-speed control executing flag Xexe_low and the low-speed control flag Xlow to "0". Subsequently, the CPU advances the process to step 1095 to temporarily end the processes of this routine.

Figure 11:
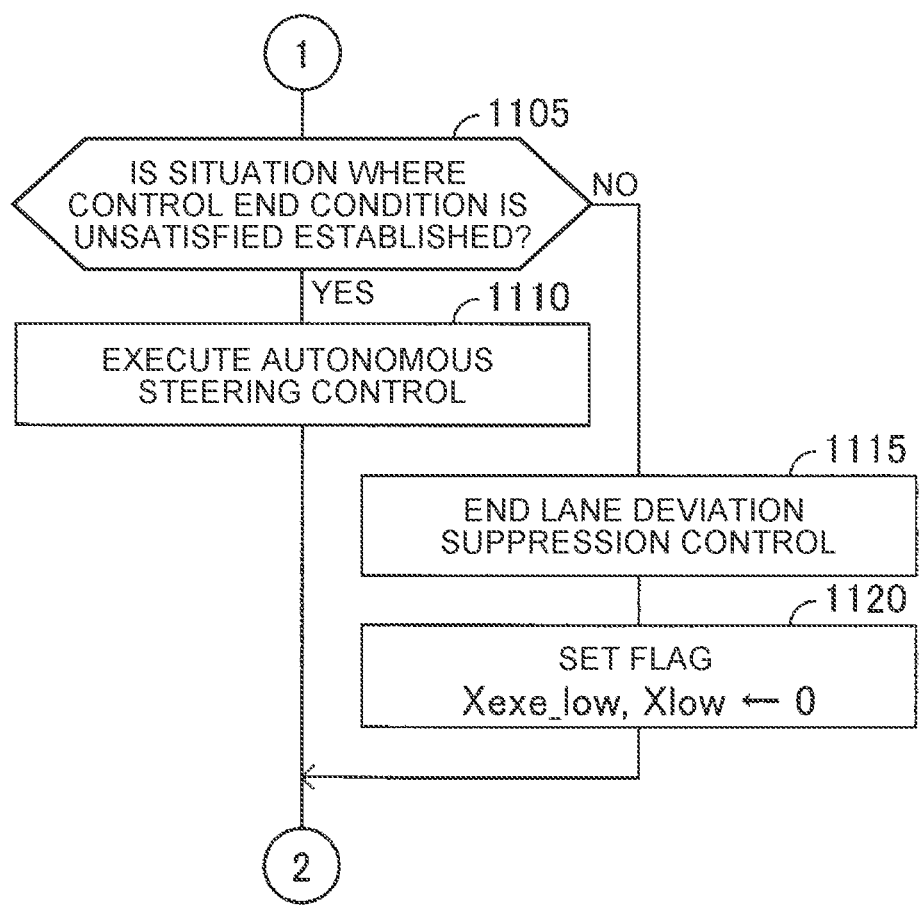
FIG. 11 is a flowchart showing a routine executed by the vehicle driving support device according to the embodiment of the present disclosure.

On the other hand, when the CPU determines "No" in step 1050, the CPU advances the process to step 1105 shown in FIG. 11 to determine whether the situation where the control end condition is unsatisfied is established. In this example, the control end condition is satisfied when, after the start of the lane deviation suppression control, the own vehicle 100 is returned to the current lane LN and the yaw angle θy of the own vehicle 100 becomes a value within the range near zero.

When the CPU determines "Yes" in step 1105, the CPU advances the process to step 1110 to execute the autonomous steering control. In other words, the CPU autonomously steers the own vehicle 100 so that the own vehicle 100 travels along the target traveling route Ltgt. When the CPU executes the process of step 1110, the CPU advances the process to step 1095 (see FIG. 10) to temporarily end the processes of this routine.

On the other hand, when the CPU determines "No" in step 1105, the CPU advances the process to step 1115 to end the lane deviation suppression control. Then, the CPU advances the process to step 1120 to set each of the values of the low-speed control executing flag Xexe_low and the low-speed control flag Xlow to "0". Subsequently, the CPU advances the process to step 1095 (see FIG. 10) to temporarily end the processes of this routine.

Figure 12:
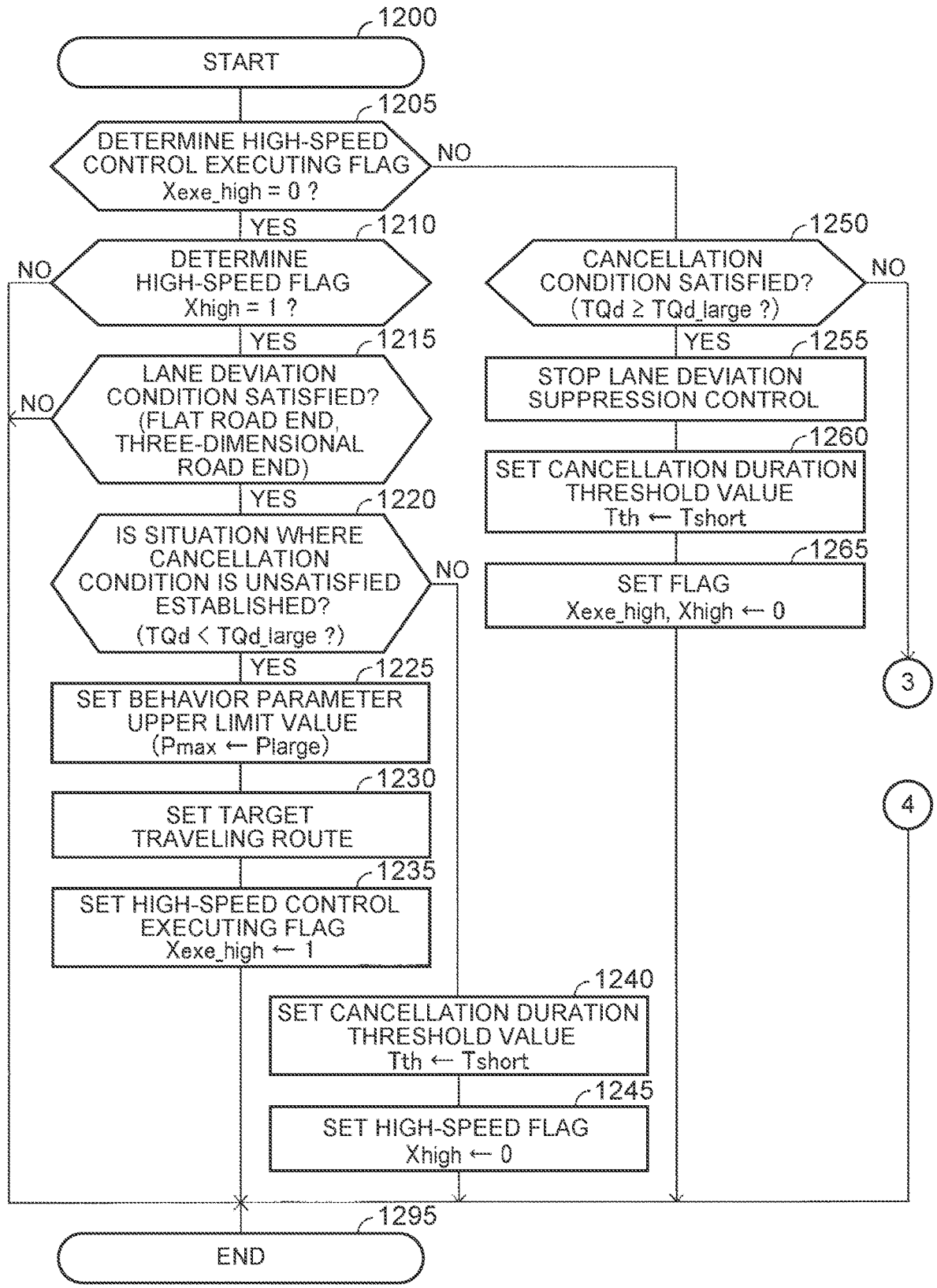
FIG. 12 is a flowchart showing a routine executed by the vehicle driving support device according to the embodiment of the present disclosure.

The CPU further executes the routine shown in FIG. 12 at a predetermined calculation cycle. Thus, at a predetermined timing, the CPU starts the process from step 1200 of the routine shown in FIG. 12, and advances the process to step 1205 to determine whether the value of the high-speed control executing flag Xexe_high is "0".

When the CPU determines "Yes" in step 1205, the CPU advances the process to step 1210 to determine whether the value of the high-speed flag Xhigh is "1". When the CPU determines "Yes" in step 1210, the CPU advances the process to step 1215 to determine whether the lane deviation condition is satisfied. As described above, here, since the own vehicle speed V is higher than the predetermined speed Vth, the CPU determines whether the lane deviation condition is satisfied for the left side deviation determination line LL and the right side deviation determination line LR set based on the flat road end and the three-dimensional road end.

When the CPU determines "Yes" in step 1215, the CPU advances the process to step 1220 to set the steering operation force threshold value TQd_th to the high-speed steering operation force threshold value TQd_large and determine whether the driver steering operation force TQd is smaller than the high-speed steering operation threshold value TQd_large, that is, whether the situation where the cancellation condition is unsatisfied is established. When the CPU determines "Yes" in step 1220, the CPU advances the process to step 1225 to set the behavior parameter upper limit value Pmax to the high-speed behavior parameter upper limit value Plarge. Next, the CPU advances the process to step 1230 to set the target traveling route Ltgt using the high-speed behavior parameter upper limit value Plarge set in step 1225. Subsequently, the CPU advances the process to step 1235 to set the value of the high-speed control executing flag Xexe_high to "1". As a result, the determination result in step 1205 will be "No". When the CPU executes the process of step 1235, the CPU advances the process to step 1295 to temporarily end the processes of this routine.

On the other hand, when the CPU determines "No" in step 1220, the CPU advances the process to step 1240 to set the cancellation duration threshold value Tth to the high-speed cancellation duration threshold value Tshort. Next, the CPU advances the process to step 1245 to set the value of the high speed flag Xhigh to "0". Subsequently, the CPU advances the process to step 1295 to temporarily end the processes of this routine.

When the CPU determines "No" in step 1210 or step 1215, the CPU directly advances the process to step 1295 to temporarily end the processes of this routine.

When the CPU determines "No" in step 1205, the CPU advances the process to step 1250 to set the steering operation force threshold value TQd_th to the high-speed steering operation force threshold value TQd_large and determine whether the driver steering operation force TQd is equal to or larger than the high-speed steering operation threshold value TQd_large, that is, whether the cancellation condition is satisfied. When the CPU determines "Yes" in step 1250, the CPU advances the process to step 1255 to stop the lane deviation suppression control. Next, the CPU advances the process to step 1260 to set the cancellation duration threshold value Tth to the high-speed cancellation duration threshold value Tshort. Then, the CPU advances the process to step 1265 to set each of the values of the high-speed control executing flag Xexe_high and the high-speed control flag Xhigh to "0". Subsequently, the CPU advances the process to step 1295 to temporarily end the processes of this routine.

On the other hand, when the CPU determines "No" in step 1250, the CPU advances the process to step 1305 shown in FIG. 13 to determine whether the situation where the control end condition is unsatisfied is established.

When the CPU determines "Yes" in step 1305, the CPU advances the process to step 1310 to execute the autonomous steering control. In other words, the CPU autonomously steers the own vehicle 100 so that the own vehicle 100 travels along the target traveling route Ltgt. When the CPU executes the process of step 1310, the CPU advances the process to step 1295 (see FIG. 12) to temporarily end the processes of this routine.

On the other hand, when the CPU determines "No" in step 1305, the CPU advances the process to step 1315 to end the lane deviation suppression control. Then, the CPU advances the process to step 1320 to set each of the values of the high-speed control executing flag Xexe_high and the high-speed control flag Xhigh to "0". Subsequently, the CPU advances the process to step 1295 (see FIG. 12) to temporarily end the processes of this routine.

The above is the specific operation of the vehicle driving support device 10.

The present disclosure is not limited to the above embodiment, and various modifications can be adopted within the scope of the present disclosure.

What is claimed is:

1. A vehicle driving support device including a control device that executes lane deviation suppression control in which an own vehicle is autonomously steered to suppress the own vehicle from deviating from a lane, wherein the control device is configured to execute the lane deviation suppression control when there is a possibility that the own vehicle deviates from the lane and when an execution prohibition condition is not satisfied, the execution prohibition condition being a condition for prohibiting execution of the lane deviation suppression control based on a steering operation by a driver of the own vehicle, execute the lane deviation suppression control so as to steer the own vehicle such that a behavior parameter representing a behavior of the own vehicle during the execution of the lane deviation suppression control does not exceed a behavior parameter upper limit value, and reduce the behavior parameter upper limit value or change the execution prohibition condition such that the execution prohibition condition is not unlikely to be satisfied when the own vehicle is traveling at a speed equal to or lower than a predetermined speed, compared to when the own vehicle is traveling at a speed higher than the predetermined speed.

2. The vehicle driving support device according to claim 1, wherein the behavior parameter is a lateral movement distance that is a distance by which the own vehicle is moved in a lateral direction by the lane deviation suppression control.

3. The vehicle driving support device according to claim 1, wherein the behavior parameter is at least one of a lateral acceleration, a steering angle, and a yaw rate of the own vehicle.

4. The vehicle driving support device according to claim 1, wherein the execution prohibition condition is a condition that a steering operation force equal to or larger than a steering operation force threshold value is being input to the own vehicle by the driver of the own vehicle, and the control device is configured to change the execution prohibition condition such that the execution prohibition condition is not unlikely to be satisfied by setting the steering operation force threshold value to a small value.

5. The vehicle driving support device according to claim 1, wherein the execution prohibition condition is a condition that a time elapsed since the execution of the lane deviation suppression control is prohibited due to satisfaction of the execution prohibition condition is shorter than a predetermined time, and the control device is configured to change the execution prohibition condition such that the execution prohibition condition is not unlikely to be satisfied by setting the predetermined time to a long time.

\* \* \* \* \*